(12) United States Patent
O'Connell (10) Patent No.: US 11,453,588 B2
(45) Date of Patent: Sep. 27, 2022

(54) THERMAL STAGE AND REDUCTION ABSORPTION SULFUR RECOVERY PROCESS

(71) Applicant: Saudi Arabian Oil Company, Dhahran (SA)

(72) Inventor: John P. O'Connell, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 142 days.

(21) Appl. No.: 16/877,784

(22) Filed: May 19, 2020

(65) Prior Publication Data

US 2020/0277186 A1 Sep. 3, 2020

Related U.S. Application Data

(62) Division of application No. 15/379,088, filed on Dec. 14, 2016, now abandoned.

(Continued)

(51) Int. Cl.
*C01B 17/04* (2006.01)
*C01B 17/16* (2006.01)
*B01D 53/14* (2006.01)

(52) U.S. Cl.
CPC ...... *C01B 17/0447* (2013.01); *C01B 17/0404* (2013.01); *C01B 17/0456* (2013.01);
(Continued)

(58) Field of Classification Search
CPC .................. C01B 17/0447; C01B 17/0404
See application file for complete search history.

(56) References Cited

U.S. PATENT DOCUMENTS 4,085,199 A 4/1978 Singleton
4,241,032 A 12/1980 Cornelisse et al.
(Continued)

FOREIGN PATENT DOCUMENTS

EP 1186334 A1 3/2002
WO 0220139 A1 3/2002
WO 2012154043 A1 11/2012

OTHER PUBLICATIONS

Connock, L. "Emerging sulphur recovery technologies New sulphur recovery processes typically promise lower costs, higher overall sulphur recoveries or ideally both." Sulphur—London—(2001): 46-55.

(Continued)

*Primary Examiner* — Paul A Wartalowicz
(74) *Attorney, Agent, or Firm* — Bracewell LLP; Constance G. Rhebergen; Eleanor L. Tyson (57) ABSTRACT

An elemental sulfur recovery unit comprising a thermal unit configured to combust an acid gas feed comprising hydrogen sulfide, an oxygen source, and a fuel gas to create a reaction furnace outlet stream, comprising elemental sulfur, a waste heat boiler configured to capture heat from the reaction furnace outlet stream to create a waste heat boiler effluent, a condenser configured to condense the waste heat boiler effluent to produce a non-condensed gases stream and a condensed stream comprising elemental sulfur, a process gas reheater configured to generate a hot gases stream, a hydrogenation reactor configured to convert the hot gases stream to create a hydrogenation effluent comprising hydrogen sulfide, a process desuperheater configured to cool the hydrogenation effluent to generate a cooled effluent, and an absorber unit configured to absorb the hydrogen sulfide from the cooled effluent to produce a hydrogen sulfide recycle stream and a waste gas stream.

7 Claims, 2 Drawing Sheets

Related U.S. Application Data (60) Provisional application No. 62/268,110, filed on Dec. 16, 2015.

(52) U.S. Cl.
CPC ........ *C01B 17/162* (2013.01); *B01D 53/1431* (2013.01); *B01D 53/1468* (2013.01); *B01D 53/1481* (2013.01); *B01D 2252/20405* (2013.01); *B01D 2252/20421* (2013.01); *B01D 2252/20426* (2013.01); *B01D 2252/20431* (2013.01); *B01D 2252/20489* (2013.01); *Y02P 20/129* (2015.11)

(56) References Cited

U.S. PATENT DOCUMENTS

| | | | |
|---|---|---|---|
| 4,684,514 A | 8/1987 | Chen | |
| 4,741,884 A * | 5/1988 | Carter | B01D 53/1406 422/171 |
| 4,795,620 A * | 1/1989 | Heisei | B01D 53/507 423/242.4 |
| 4,861,930 A * | 8/1989 | Cottrell | C07C 13/00 585/317 |
| 5,352,433 A | 10/1994 | Watson | |
| 5,468,458 A | 11/1995 | Watson | |
| 5,486,345 A | 1/1996 | Watson | |
| 5,676,921 A | 10/1997 | Heisel et al. | |
| 6,418,864 B1 * | 7/2002 | Piyasil | F23G 5/0276 110/165 R |
| 2002/0006371 A1 * | 1/2002 | Watson | B01D 53/1462 423/224 |
| 2002/0083698 A1 * | 7/2002 | Miyoshi | F01K 23/067 60/39.12 |
| 2002/0094308 A1 | 7/2002 | Portz | |
| 2004/0022721 A1 | 2/2004 | Watson et al. | |
| 2007/0134147 A1 | 6/2007 | Graville | |
| 2007/0282131 A1 * | 12/2007 | Stauffer | C07C 319/02 568/70 |
| 2011/0171115 A1 | 7/2011 | Stevens et al. | |
| 2011/0280795 A1 | 11/2011 | Gupta | |
| 2012/0251436 A1 * | 10/2012 | Alkhazov | C01B 17/0426 423/574.1 |
| 2014/0079614 A1 | 3/2014 | Liu et al. | |
| 2015/0307359 A1 | 10/2015 | Weiss et al. | |

OTHER PUBLICATIONS

The International Search Report and Written Opinion for related PCT application PCT/US2016/066111 dated Apr. 24, 2017.

Mattsson-Bose, K. W., and Lili G. Lyddon. "Using a process simulator to improve sulphur recovery." Sulphur—London—(1997): 37-42.

Nehb et al., "Sulfur", Ullmann's Encyclopedia of Industrial Chemistry, 2006, pp. 1-71, Wiley-VCH Verlag GmbH & Co.

Shell SCOT process description.

* cited by examiner

FIG. 1

FIG. 2

THERMAL STAGE AND REDUCTION ABSORPTION SULFUR RECOVERY PROCESS

CROSS REFERENCE TO RELATED APPLICATIONS

This application is a divisional application of U.S. Non-Provisional application Ser. No. 15/379,088 filed on Dec. 14, 2016, which claims priority from U.S. Provisional Application No. 62/268,110 filed on Dec. 16, 2015. For purposes of United States patent practice, this application incorporates the contents of both the Provisional Application and Non-Provisional Application by reference in their entirety.

TECHNICAL FIELD

Disclosed are an apparatus and process for recovery of elemental sulfur. More specifically, embodiments relate to an apparatus and process for converting hydrogen sulfide ($H_2S$) and other sulfur-containing compounds in an acid gas feed stream to elemental sulfur.

BACKGROUND

The sulfur recovery industry has been using the gas phase Claus reactions as the basis for recovering elemental sulfur from hydrogen sulfide ($H_2S$) since the 1940s. The Claus plant, the long-standing 'workhorse' of the industry, uses the Claus chemistry to achieve conventionally between 96 percent (%) to 98% recovery of elemental sulfur from an acid gas stream. The Claus reactions produce gas phase elemental sulfur that is subsequently condensed and recovered in the liquid form.

The vast majority of all operating Claus plants worldwide include a thermal stage (for example, a free-flame reaction furnace and a wasteheat boiler) followed by either two or three catalytic converters, or catalytic stages; a two-stage design results in recovery efficiencies of about 96% and a three-stage design results in recovery efficiencies of about 98%. There are only a handful of four-stage designs in the world because early on the sulfur recovery industry recognized that a fourth catalytic stage only marginally increased the recovery efficiency greater than 98% and was therefore uneconomical.

Owing to the negative impact of acid rain, formed due to high levels of sulfur dioxide ($SO_2$) in the atmosphere, emissions controls, normally via governmental environmental regulatory bodies, limit the amount of $SO_2$ emitted in the effluent of Claus plants. In response, the industry began developing Tail Gas Treatment (TGT) technologies to be placed immediately downstream of the Claus plant to further improve the recovery efficiency of the sulfur recovery unit to greater than 99%, or in some cases greater than 99.9%, effectively reducing $SO_2$ from the effluent.

By far the most common combination of Claus plant and TGT for achieving greater than 99.9% recovery is a Claus plant followed by a reduction/absorption amine-based technology. This technology requires the reduction and hydrolysis of sulfur bearing compounds back to the form of $H_2S$ to allow for absorption in an amine contactor. The $H_2S$ that is absorbed into the amine is then regenerated and sent back to the front end of the Claus plant as a recycle acid gas stream.

In addition to recovering elemental sulfur, Claus plants also destroy contaminants present in acid gas streams. Contaminants can include hydrocarbons having between one carbon and six carbons ($C_1$-$C_6$ hydrocarbons), benzene, toluene, ethyl benzene, and xylenes (including ortho-xylene, meta-xylene, and para-xylene) (BTEX), methanol ($CH_3OH$), ammonia ($NH_3$), hydrogen cyanide, mercaptans, and other organosulfur compounds. The thermal stage of the Claus plant plays a critical role in the destruction of these contaminants. If these contaminants are not properly destroyed in the thermal stage they can negatively impact the purity of the sulfur product, can cause problems in the downstream units including catalytic deactivation, and can end up being emitted to the atmosphere in an uncombusted form.

While the conventional Claus plant does provide a path for recovery of sulfur, it is not without drawbacks. The catalytic stages require catalyst regeneration and catalyst replacement (typically replacement occurs every 2 to 6 years) due to catalyst fouling, deactivation, and plugging. The regeneration of catalyst or complete catalyst changeout can result in significant downtime, potentially putting the entire processing unit offline. The catalytic stages, with alumina and/or titania catalyst, are sensitive to the presence of contaminants and thermal excursions. These sensitivities can make managing the catalytic stages cumbersome and costly.

SUMMARY

Disclosed are an apparatus and process for recovery of elemental sulfur. More specifically, embodiments relate to an apparatus and process for converting hydrogen sulfide ($H_2S$) and other sulfur-containing compounds in an acid gas feed stream to elemental sulfur.

In a first aspect, an elemental sulfur recovery unit for processing an acid gas feed to recover elemental sulfur is provided. The elemental sulfur recovery unit includes a thermal unit. The thermal unit is configured to combust the acid gas feed, an oxygen source, and a fuel gas to create a reaction furnace outlet stream. The thermal unit includes a main burner and a reaction furnace. The main burner is configured to combust the acid gas feed, the oxygen source, and the fuel gas to a minimum reaction furnace temperature. The acid gas feed includes hydrogen sulfide and an amount of the hydrogen sulfide is converted to elemental sulfur in the reaction furnace. A waste heat boiler is fluidly connected to the reaction furnace of the thermal unit. The waste heat boiler is configured to capture heat from the reaction furnace outlet stream to create a waste heat boiler effluent, where the heat captured from the reaction furnace outlet stream heats a boiler feedwater stream to create saturated steam. A sulfur condenser is fluidly connected to the waste heat boiler. The sulfur condenser is configured to cool the waste heat boiler effluent to produce a condensed liquid sulfur stream and a non-condensed gases stream. The condensed liquid sulfur stream includes the elemental sulfur and the non-condensed gases stream includes hydrogen sulfide, elemental sulfur vapor, sulfur-containing contaminants, sulfur dioxide, and water vapor. A gas reheater is fluidly connected to the sulfur condenser. The gas reheater is configured to heat the non-condensed gases stream to a hydrogenation temperature to generate a hot gases stream, where the hot gases stream includes sulfur dioxide and elemental sulfur. A hydrogenation reactor is fluidly connected to the gas reheater. The hydrogenation reactor is configured to convert the hot gases stream to create a hydrogenation effluent, where the hydrogenation reactor includes a hydrogenation catalyst in a catalyst bed and the hydrogenation effluent includes hydrogen sulfide, carbon dioxide, water vapor, and hydrogen. A process desuperheater is fluidly connected to the hydrogenation reactor. The process desuperheater is configured to condense the majority of the water vapor in the hydrogenation effluent to produce condensed water and is further configured to generate a cooled effluent, where the condensed water is separated from the cooled effluent in the process desuperheater. An absorber unit is fluidly connected to the process desuperheater. The absorber unit is configured to absorb the hydrogen sulfide from the cooled effluent to generate an absorbed hydrogen sulfide rich solvent stream and a waste gas stream. The absorber unit includes an absorbing solvent. The absorbed hydrogen sulfide rich solvent stream includes hydrogen sulfide. The waste gas stream includes hydrogen sulfide and sulfur-containing contaminants. A regenerator fluidly connected to the absorber, the regenerator configured to desorb the hydrogen sulfide from the absorbed hydrogen sulfide rich solvent stream to generate a hydrogen sulfide recycle stream and a regenerated solvent, where the hydrogen sulfide recycle stream include hydrogen sulfide.

In certain aspects, the minimum reaction furnace temperature is between 1050° C. and 1250° C. In certain aspects, the elemental sulfur recovery unit further includes a tail gas analyzer configured to analyze a concentration of the hydrogen sulfide and the sulfur dioxide in the non-condensed gases stream. In certain aspects, the hot gases stream is between 125° C. and 300° C. In certain aspects, the gas reheater is a direct-fired reducing gas producing reheater configured to combust a fuel feed and an air feed substoichiometrically to produce hydrogen and carbon monoxide, where the hot gases stream includes hydrogen and carbon monoxide. In certain aspects, the hydrogenation reactor is configured to reduce the sulfur dioxide and elemental sulfur in the hot gases stream to hydrogen sulfide. In certain aspects, the hydrogenation catalyst in the hydrogenation reactor includes a cobalt-molybdenum based catalyst. In certain aspects, the catalyst bed further includes titanium. In certain aspects, the absorbing solvent is selected from the group consisting of DEA, MEA, MDEA, DIPA, 2-(2-aminoethoxy)ethanol, FLEXSORB® solvents, and a combination of the same. In certain aspects, the hydrogen sulfide recycle stream is recycled to the thermal unit. In certain aspects, the hydrogen sulfide recycle stream includes hydrogen sulfide in an amount greater than 25% by volume. In certain aspects, the elemental sulfur recovery unit further includes an oxidizer fluidly connected to the absorber unit configured to burn the waste gas stream with an air stream and a fuel stream to produce a sulfur dioxide waste stream, where the hydrogen sulfide and sulfur-containing contaminants in the waste gas stream are converted to sulfur dioxide in the oxidizer.

In a second aspect, a sulfur recovery process to recover elemental sulfur from an acid gas feed is provided. The sulfur recovery process includes the steps of feeding the acid gas feed, an oxygen source, and a fuel gas to a main burner of a thermal unit, reacting the acid gas feed, the oxygen source, and the fuel gas at the minimum reaction furnace temperature in a reaction furnace of the thermal unit to create a reaction furnace outlet stream, where the reaction furnace outlet stream includes elemental sulfur and sulfur-containing contaminants, recovering heat from the reaction furnace outlet stream in a waste heat boiler to create a waste heat boiler effluent, the waste heat boiler configured to capture heat from the reaction furnace outlet stream to heat a boiler feedwater stream to create saturated steam, condensing the waste heat boiler effluent in a sulfur condenser to produce a condensed liquid sulfur stream and a non-condensed gases stream, the condensed liquid sulfur stream includes the elemental sulfur, the non-condensed gases stream includes water vapor and the sulfur-containing contaminants. The process further includes the steps of reheating the non-condensed gases stream in a gas reheater to a hydrogenation temperature to generate a hot gases stream, feeding the hot gases stream to a hydrogenation reactor, the hydrogenation reactor includes a hydrogenation catalyst, reacting the hot gases stream in the hydrogenation reactor to produce a hydrogenation effluent, where the hydrogenation effluent includes hydrogen sulfide and water vapor, cooling the hydrogenation effluent to produce a condensed water and a cooled effluent, where the cooled effluent comprises hydrogen sulfide, feeding the cooled effluent to an absorber, where the absorber includes an absorbing solvent configured to absorb hydrogen sulfide from the cooled effluent to generate an absorbed hydrogen sulfide rich solvent stream and a waste gas stream, and feeding the absorbed hydrogen sulfide rich solvent stream into a regenerator configured to desorb the hydrogen sulfide from the absorbed hydrogen sulfide rich solvent stream to generate a hydrogen sulfide recycle stream and a regenerated solvent.

In certain aspects, the sulfur recovery process further includes step of venting the waste gas stream to atmosphere. In certain aspects, the sulfur recovery process further includes the step of combusting the waste gas stream, an air stream, and fuel stream in a oxidizer to produce a sulfur dioxide waste stream that includes sulfur dioxide. In certain aspects, the sulfur recovery process further includes removing an amount of sulfur dioxide from sulfur dioxide waste stream to produce a sulfur dioxide recycle stream and a waste effluent stream such that the waste effluent stream contains less than 1% by volume sulfur dioxide, and recycling sulfur dioxide recycle stream to the main burner of the thermal unit.

BRIEF DESCRIPTION OF THE DRAWINGS

These and other features, aspects, and advantages will become better understood with regard to the following descriptions, claims, and accompanying drawings. It is to be noted, however, that the drawings illustrate only several embodiments and are therefore not to be considered limiting of the scope as it can admit to other equally effective embodiments.

DETAILED DESCRIPTION

While the scope will be described with several embodiments, it is understood that one of ordinary skill in the relevant art will appreciate that many examples, variations and alterations to the apparatus and methods described are within the scope and spirit of the embodiments. Accordingly, the embodiments described here are set forth without any loss of generality, and without imposing limitations, on the claims. Those of skill in the art understand that the scope includes all possible combinations and uses of particular features described in the specification. In both the drawings and the detailed description, like numbers refer to like elements throughout.

Figure 1:
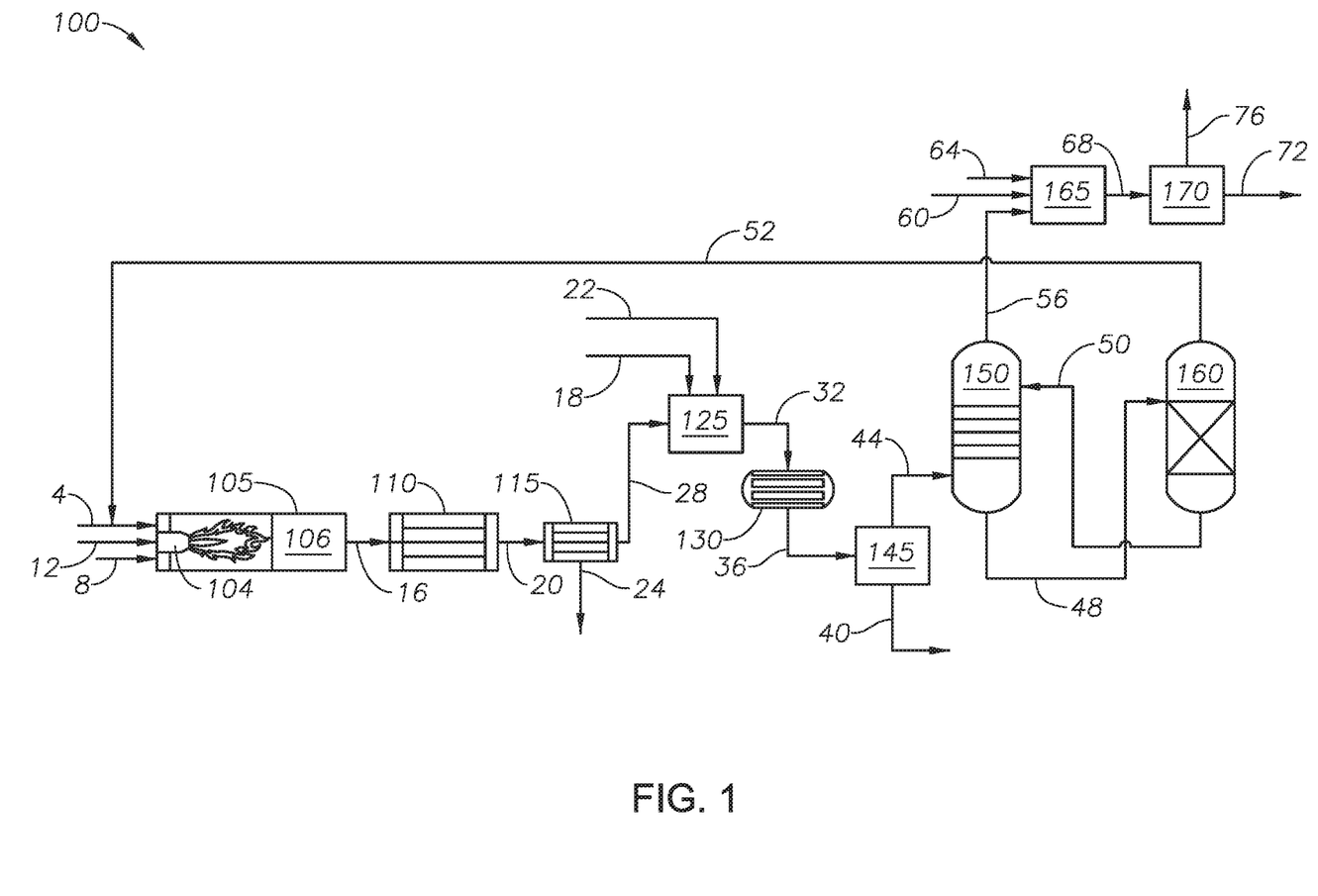
FIG. 1 is a process diagram of an embodiment of the elemental sulfur recovery unit.

Referring to FIG. 1, a process diagram of an embodiment of elemental sulfur recovery unit 100 is provided. Acid gas feed 4 and oxygen source 8 are fed to main burner 104 of thermal unit 105. Thermal unit 105 can be a free-flame thermal unit suitable to combust H$_2$S and other components.

Acid gas feed 4 can be from any source. Acid gas feed 4 can include H$_2$S, water (H$_2$O), process gases, process contaminants, sulfur-containing contaminants, and combinations of the same. Process gases can include carbon monoxide (CO), carbon dioxide (CO$_2$), nitrogen (N$_2$), hydrogen (H$_2$), and combinations of the same. Process contaminants can include hydrocarbons, BTEX, CH$_3$OH, NH$_3$, and combinations of the same. Sulfur-containing contaminants can include carbonyl sulfide (COS), carbon disulfide (CS$_2$), mercaptans, other organosulfur compounds, and combinations of the same. As used throughout, "organosulfur compounds" refers to organic compounds that include at least one sulfur atom. The nature and composition of the process gases, the process contaminants, and the sulfur-containing contaminants depends on the process that is the source for acid gas feed 4. The precise composition of acid gas feed 4 depends upon the source and can be determined using any technology capable of analyzing the composition of an acid gas feed stream. In at least one embodiment, the source of acid gas feed 4 is a refinery, and acid gas feed 4 includes NH$_3$. In an alternate embodiment, the source of acid gas feed 4 is a sour gas plant and acid gas feed 4 is in the absence of NH$_3$.

Oxygen source 8 can be any oxygen (O$_2$) containing gas suitable for use in thermal unit 105. Example gases suitable for use as oxygen source 8 include air, oxygen-enriched air, pure O$_2$, or any combination thereof. In at least one embodiment, oxygen source 8 is air. In at least one embodiment, oxygen source 8 is provided such that O$_2$ is supplied in stoichiometric excess to combust all of the fuel gas components and one-third of the hydrogen sulfide, such that reaction furnace outlet stream 16 has a stoichiometric ratio of H$_2$S:SO$_2$ in the range of 2:1 to 15:1.

Fuel gas 12 can be any fuel gas suitable for co-firing in thermal unit 105. Fuel gas 12 provides additional fuel to adjust the temperature in main burner 104 to achieve the minimum reaction furnace temperature. In at least one embodiment, elemental sulfur recovery unit 100 operates in the absence of fuel gas 12. Elemental sulfur recovery unit 100 can operate in the absence of fuel gas 12 when no temperature adjustment is needed. In at least one embodiment, fuel gas 12 is natural gas. In at least one embodiment, fuel gas 12 includes C$_1$-C$_6$ hydrocarbons. In at least one embodiment, fuel gas 12 includes C$_1$-C$_{6+}$ hydrocarbons. As used throughout "C$_{6+}$" refers to hydrocarbons with 6 or more carbon atoms, such as a hydrocarbon with 6 carbon atoms, a hydrocarbon with 7 carbon atoms, a hydrocarbon with 8 carbon atoms, or a hydrocarbon with more than 8 carbon atoms.

Thermal unit 105 is designed and operated to convert H$_2$S and the sulfur-containing contaminants to elemental sulfur, SO$_2$, H$_2$O, and combinations of the same. Thermal unit 105 is designed and operated to destroy the process contaminants contained in acid gas feed 4. As used throughout, "destroy" refers to conversion of the components into forms that can be released into the atmosphere. The temperature of thermal unit 105 affects the amount of elemental sulfur, SO$_2$, and H$_2$O present in reaction furnace outlet stream 16 and the amount of process contaminants that are destroyed. Main burner 104 allows for mixing and combustion of acid gas feed 4, oxygen source 8, and fuel gas 12 at the minimum reaction furnace temperature. The minimum reaction furnace temperature is determined based on the composition of acid gas feed 4. The minimum reaction furnace temperature is in the range of 850 degrees Celsius (° C.) to 1300° C., alternately between 1050° C. and 1250° C. In at least one embodiment, acid gas feed 4 is in the absence of NH$_3$ and the minimum reaction furnace temperature is at least 1050° C. In at least one embodiment, acid gas feed 4 includes NH$_3$ and the minimum reaction furnace temperature is 1250° C.

In at least one embodiment, acid gas feed 4 is preheated. Preheating acid gas feed 4 reduces the fuel gas and oxygen needed in the thermal unit, which can make the thermal unit smaller and reduce costs. In some embodiments, preheating units are added upstream of main burner 104. In at least one embodiment, oxygen source 8 is air, which is preheated. The addition of fuel gas 12 can increase the temperature in main burner 104 and reaction furnace 106. The need for preheating units and the ratio of oxygen and fuel gas to acid gas feed 4 depends on the concentration of H$_2$S in acid gas feed 4.

Acid gas feed 4, oxygen source 8, and fuel gas 12 are combusted in main burner 104 before passing to reaction furnace 106. H$_2$S can be converted to SO$_2$ and elemental sulfur through conversion reactions. The bulk of the conversion reactions occur in reaction furnace 106. The conversion of H$_2$S to elemental sulfur can occur according to the following reactions:

$$2H_2S+3O_2 \rightarrow 2SO_2+2H_2O$$

$$2H_2S+SO_2 \rightarrow 3S+2H_2O \quad \text{(Claus reaction)}$$

The conversion of the H$_2$S entering thermal unit 105 to elemental sulfur is between 30 mole percent (mol %) and 80 mol %, alternately between 40 mol % and 78 mol %, alternately between 50 mol % and 75 mol %, alternately between 60 mol % and 70 mol %. In at least one embodiment, the amount of H$_2$S converted to elemental sulfur in reaction furnace 106 is between 50 mol % and 75 mol %. Without being bound to a particular theory, it is understood by one of skill in the art that a reaction furnace is considered a complex kinetically limited vessel rather than an equilibrium vessel. In the absence of catalytic converters, the conversion of H$_2$S entering thermal unit 105 is expected to achieve a conversion of H$_2$S and sulfur-containing contaminants of between 50 mol % and 70 mol % to elemental sulfur in thermal unit 105. In at least one embodiment, side reactions in thermal unit 105 can form sulfur-containing contaminants.

Destruction reactions of the process contaminants can also occur in thermal unit 105. The process contaminants present in acid gas feed 4 can be reduced by 95 weight percent (wt %), alternately by 97 wt %, alternately by 99 wt %, alternately by 99.5 wt %, alternately by 99.9 wt %, alternately by 99.99 wt %, and alternately by 100 wt %.

Reaction furnace outlet stream 16 exits reaction furnace 106 at the minimum reaction furnace temperature and is cooled prior to further processing. In at least one embodiment, the heat energy of reaction furnace outlet stream 16 is recovered and used to heat other streams. Reaction furnace outlet stream 16 leaves reaction furnace 106 and enters waste heat boiler 110. Waste heat boiler 110 can capture heat energy from reaction furnace outlet stream 16 to heat a boiler feedwater stream (not shown) to create a saturated steam stream (not shown). By producing saturated steam, waste heat boiler 110 captures and removes bulk heat from reaction furnace outlet stream 16. Waste heat boiler 110 can be designed to generate saturated steam at any process conditions desirable. In some embodiments, waste heat boiler 110 can be designed to generate high pressure saturated steam. In at least one embodiment, the saturated steam produced by waste heat boiler 110 is high pressure saturated steam at a pressure of 600 psig (pounds per square inch gauge) (4.14 megapascals (MPa)). The amount of heat energy captured from reaction furnace outlet stream 16 controls the temperature of waste heat boiler effluent 20. In at least one embodiment, the temperature of waste heat boiler effluent 20 is between 295° C. and 370° C. In at least one embodiment, waste heat boiler 110 is a horizontal shell and tube exchanger.

Reaction furnace outlet stream 16 and waste heat boiler effluent 20 can contain $H_2S$, elemental sulfur, $SO_2$, sulfur-containing contaminants, $H_2O$ (vapor), process gases, and process contaminants. The exact composition of reaction furnace outlet stream 16 and waste heat boiler effluent 20 depends on the composition of acid gas feed 4 and the conditions in thermal unit 105, including the minimum reaction furnace temperature. The amount of $H_2S$, process contaminants, and sulfur-containing contaminants present in reaction furnace outlet stream 16 and waste heat boiler effluent 20 are reduced relative to the amount of those components present in acid gas feed 4. In at least one embodiment, oxygen source 8 is air, such that argon (Ar) is present in reaction furnace outlet stream 16 and waste heat boiler effluent 20.

Waste heat boiler effluent 20 is fed to sulfur condenser 115 to produce condensed liquid sulfur stream 24 and non-condensed gases stream 28. Sulfur condenser 115 further reduces the temperature of waste heat boiler effluent 20 causing the elemental sulfur vapor present in waste heat boiler effluent 20 to condense as condensed liquid sulfur stream 24. The temperature of condensed liquid sulfur stream 24 is between 120° C. and 155° C., alternately between 125° C. and 150° C. Condensed liquid sulfur stream 24 contains greater than 95 wt % elemental sulfur, alternately greater than 97 wt % elemental sulfur, alternately greater than 99 wt % elemental sulfur, alternately greater than 99.5 wt % elemental sulfur, alternately greater than 99.9 wt % elemental sulfur.

Non-condensed gases stream 28 contains those components present in waste heat boiler effluent 20 that do not condense in sulfur condenser 115. Non-condensed gases stream 28 can contain $H_2S$, elemental sulfur vapor, $SO_2$, sulfur-containing contaminants, $H_2O$ vapor, process gases, process contaminants, and combinations of the same. The exact composition of non-condensed gases stream 28 depends on the composition of waste heat boiler effluent 20. In at least one embodiment, non-condensed gases stream 28 contains less than 1% by volume elemental sulfur vapor. Non-condensed gases stream 28 can be at a temperature between 120° C. and 155° C., alternately between 125° C. and 150° C.

In at least one embodiment, sulfur condenser 115 can be used to capture heat energy from waste heat boiler effluent 20 to heat a boiler water stream (not shown) to create a saturated steam stream (not shown). In at least one embodiment, the saturated steam stream is a low pressure saturated steam at a pressure of 50 psig (0.345 MPa).

Non-condensed gases stream 28 is fed to gas reheater 125. Gas reheater 125 heats non-condensed gases stream 28 to the hydrogenation temperature to generate hot gases stream 32. Gas reheater 125 is any heat exchanger or fired heater capable of heating non-condensed gases stream 28. In at least one embodiment, gas reheater 125 is a direct-fired reducing gas producing reheater capable of combusting fuel gas and oxygen sub-stoichiometrically to produce hydrogen and carbon monoxide (CO). As used throughout, "stoichiometric," "stoichiometric amount" or "stoichiometrically" refers to the relative quantities of reactants, such that when the reaction proceeds to completion, all of the reactants are consumed, there is no deficiency of a reactant and there is no excess of a reactant. Thus, "oxygen sub-stoichiometrically" means that there is a deficiency of oxygen in gas reheater 125 such that CO and $H_2$ can form in addition to $H_2O$ and $CO_2$. Fuel feed 22 and air feed 18 can be fed to gas reheater 125, as shown in FIG. 1. In embodiments where gas reheater 125 is a direct-fired reducing gas producing reheater, fuel feed 22 and air feed 18 can be combusted and can produce $H_2$, CO, $CO_2$, and $H_2O$. Fuel feed 22 can be from the same source as fuel gas 12. Air feed 18 can be from the same source as oxygen source 8. Non-condensed gases stream 28 can be heated in gas reheater 125. Non-condensed gases stream 28 can be introduced to gas reheater 125 downstream of the point where combustion of fuel feed 22 and air feed 18 occurs to avoid combustibles in non-condensed gases stream 28 from becoming involved in combustion. In embodiments where gas reheater 125 is a direct fired reducing gas producing reheater, hot gases stream 32 contains more hydrogen than non-condensed gases stream 28. Hot gases stream 32 can include $H_2S$, elemental sulfur vapor, $SO_2$, sulfur-containing contaminants, water vapor, process gases, process contaminants, and combinations of the same. In at least one embodiment, hot gases stream 32 includes reducing gases, such as $H_2$ and CO. In at least one embodiment, hot gases stream 32 can include $H_2S$, $SO_2$, elemental sulfur, and reducing gases. The hydrogenation temperature is the temperature at which hydrogenation reactor 130 operates. The hydrogenation temperature of hot gases stream 32 can be between 125° C. and 300° C., alternately between 200° C. and 300° C., alternately between 220° C. and 280° C., and alternately between 240° C. and 260° C. In at least one embodiment, the hydrogenation temperature is between 220° C. and 280° C. Hot gases stream 32 is fed to hydrogenation reactor 130.

Hydrogenation reactor 130 can convert the elemental sulfur, $SO_2$, and sulfur-containing contaminants in hot gases stream 32 to $H_2S$. Examples of reactions in hydrogenation reactor 130 that can convert elemental sulfur, $SO_2$, and the sulfur-containing contaminants include reduction reactions, hydrolysis reactions, water-gas shift reactions, sour-gas shift reactions, and combinations of the same. As used throughout, "reduction reaction" refers to any reaction in which the reactants use $H_2$ to form $H_2S$. Examples of reduction reactions that can occur in hydrogenation reactor 130 include the following:

$$SO_2 + 3H_2 \rightarrow H_2S + 2H_2O$$

$$S_{vap} + H_2 \rightarrow H_2S$$

$$S_{liq} + H_2 \rightarrow H_2S$$

In at least one embodiment, reduction of $SO_2$ to $H_2S$ occurs to complete conversion.

Possible sources of hydrogen ($H_2$) can include $H_2$ formation in thermal unit 105, $H_2$ formation from a substoichiometric burn of fuel gas in gas reheater 125, a water gas shift reaction with CO in hydrogenation reactor 130, or a supplemental $H_2$ stream (not shown) added upstream of hydrogenation reactor 130. In at least one embodiment, CO is formed in thermal unit 105.

As used throughout, "hydrolysis" or "hydrolysis reaction" refers to a breakdown of a compound due to reaction with water. Examples of hydrolysis reactions that can occur in hydrogenation reactor 130 include the following:

$$COS + H_2O \rightarrow H_2S + CO_2$$

$$CS_2 + 2H_2O \rightarrow 2H_2S + CO_2$$

In at least one embodiment, hydrolysis of $CS_2$ occurs to complete conversion. In at least one embodiment, hydrolysis of COS proceeds to equilibrium.

An example of a water-gas shift reaction that can occur in hydrogenation reactor 130 includes the following:

$$CO+H_2O \rightarrow CO_2+H_2$$

In at least one embodiment, the water-gas shift reaction proceeds to equilibrium.

Hydrogenation reactor 130 can include a hydrogenation catalyst. The hydrogenation catalyst can be any catalyst capable of enabling reactions in hydrogenation reactor 130 that convert sulfur-containing compounds to $H_2S$. In at least one embodiment, the hydrogenation catalyst is a cobalt-molybdenum based catalyst. In at least one embodiment, hydrogenation reactor 130 is a fixed bed reactor. In at least one embodiment, hydrogenation reactor 130 is a fixed bed reactor with the catalyst bed having a thickness between three feet and four feet. In at least one embodiment, hydrogenation reactor 130 is a fixed bed reactor charged with a three foot to four foot thick cobalt-molybdenum catalyst bed. In at least one embodiment, the catalyst bed includes a titanium-based catalyst capable of enabling the hydrolysis reactions. The titanium-based catalyst can be added below the hydrogenation catalyst in the catalyst bed of hydrogenation reactor 130. The $H_2S$ formed in hydrogenation reactor 130 exit hydrogenation reactor 130 as hydrogenation effluent 36. Hydrogenation effluent 36 can include $H_2S$, $H_2O$, $CO_2$, $H_2$, and combinations of the same.

Process desuperheater 145 reduces the temperature of hydrogenation effluent 36 to produce condensed water 40 and cooled effluent 44. Reducing the temperature of hydrogenation effluent 36 can condense the majority of the water vapor present in hydrogenation effluent 36 to liquid water. As used throughout, "majority" refers to 51 percent or more. Condensed water 40 contains the liquid water condensed in process desuperheater 145. Cooled effluent 44 contains the gases not condensed in process desuperheater 145. In some embodiments, process desuperheater 145 separates the liquid water from the gases. In some embodiments, process desuperheater 145 can be any type of desuperheater capable of cooling hydrogenation effluent 36 and separating the liquid water that condenses and the gases that do not condense. Examples of desuperheaters include indirect contact desuperheaters, direct contact desuperheaters, and water spray desuperheaters. In at least one embodiment, process desuperheater 145 can be a contact condenser. In a least one embodiment, process desuperheater 145 includes a desuperheater and a contact condenser. The temperature of cooled effluent 44 is between 25° C. and 55° C., alternately between 30° C. and 50° C., and alternately between 35° C. and 45° C. In at least one embodiment, the temperature of cooled effluent 44 is between 30° C. and 50° C. Condensed water 40 is separated from cooled effluent 44. In at least one embodiment, condensed water 40 can be collected, stored, or further processed. In at least one embodiment, condensed water 40 includes sulfides, such that condensed water 40 is sour water, and can be further processed to remove the sulfides. "Sulfide" as used throughout includes hydrogen sulfide, and any sulfide salt. Cooled effluent 44 is fed to absorber unit 150. Advantageously, cooling hydrogenation effluent 36 and condensing the water in process desuperheater 145 in order to separate the water as condensed water 40 prevents excess water from entering absorber unit 150. As used throughout, "excess water" refers to the amount of water greater than the amount of water than can be processed in the absorber, such that excess water is the amount of water greater than the concentration of water in the overhead of absorber unit 150. By separating out the excess water upstream of absorber unit 150, the excess water is not carried into absorber unit 150, where the presence of excess water would dilute the solvent and reduce its effectiveness. As a result, removing excess water in process desuperheater 145 maintains a constant concentration of water in absorber unit 150. In addition, the presence of water in absorber unit 150 would result in an accumulation in absorber unit 150, which cannot handle such accumulation.

Absorber unit 150 removes $H_2S$ from cooled effluent 44. Cooled effluent 44 is fed to absorber unit 150 where the $H_2S$ is absorbed producing absorbed hydrogen sulfide rich solvent stream 48 and waste gas stream 56. Absorber unit 150 can operate at a pressure of between 1 psig and 2 psig. Absorber unit 150 includes an absorbing solvent. The absorbing solvent can be any material capable of absorbing $H_2S$. In at least one embodiment, the absorbing solvent can preferentially absorb the $H_2S$ over the $CO_2$ into the absorbing solvent. Examples of the absorbing solvent can include DEA, MEA, MDEA, DIPA, 2-(2-aminoethoxy)ethanol, FLEXSORB® solvents, and hindered amines, or a combination of the same. In at least one embodiment, absorber unit 150 includes an absorbing solvent capable of achieving an overall recovery efficiency of greater than 99.9 percent of total inlet equivalent sulfur in acid gas feed 4. In other words, elemental sulfur recovery unit 100 is capable of removing greater than 99.9% of the elemental sulfur present in acid gas feed 4. In a particular embodiment, waste gas stream 56 is vented to the atmosphere. Waste gas stream 56 can be vented to the atmosphere where allowed by environmental emissions regulations. In a particular embodiment, the temperature of waste gas stream 56 is between 25° C. and 55° C.

In at least one embodiment, cooled effluent 44 contains an amount of $H_2S$. In at least one embodiment, the amount of hydrogen sulfide is between 10% by weight and 50% by weight. The amount of hydrogen sulfide present in cooled effluent 44 is dependent on the hydrogen sulfide content of acid gas stream 4 and the amount of $H_2S$ converted to elemental sulfur in reaction furnace 105.

Absorbed hydrogen sulfide rich solvent stream 48 is fed to regenerator 160. Regenerator 160 desorbs the $H_2S$ from absorbed hydrogen sulfide rich solvent stream 48 to generate hydrogen sulfide recycle stream 52 and regenerate the absorbing solvent to produce regenerated solvent 50. Regenerator 160 is any regenerator capable of stripping the $H_2S$ from the absorbing solvent. Regenerator 160 can operate at a pressure of between 5 psig and 20 psig. One of skill in the art will understand that absorber unit 150 and regenerator 160 can include pumps, heat exchangers and other units to effect fluid transfer between the two units and ensure proper functioning. For example, a pump (not shown) can be used to transfer lean amine in regenerated solvent 50 from the bottom of regenerator 160 through heat exchangers (not shown) to absorber unit 150. Hydrogen sulfide recycle stream 52 can be stored, sent for further processing, or recycled. In a particular embodiment, hydrogen sulfide recycle stream 52 is recycled in the process to thermal unit 105. In a particular embodiment, hydrogen sulfide recycle stream 52 is greater than 25% $H_2S$ by volume, alternately greater than 50% $H_2S$ by volume, alternately greater than 75% $H_2S$ by volume, and alternately greater than 90% $H_2S$ by volume. The regenerated absorbing solvent can be returned to absorber unit 150 as regenerated solvent 50.

In addition to separating $H_2S$ for recycle to the inlet of thermal unit 105, absorbing unit 150 provides a method to separate non-reactant (non-combustible) gases, such as $N_2$, $A_2$, and $CO_2$, such that the non-reactant gases do not accumulate in elemental sulfur recovery unit 100.

Waste gas stream 56 can include $H_2S$, sulfur-containing contaminants, process gases, and combinations of the same. In at least one embodiment, waste gas stream 56 further includes sulfur-containing contaminants, such as COS. The amount of sulfur-containing contaminants, process gases and COS in waste stream 56 depends on the reaction efficiency in hydrogenation reactor 130. For example, as the hydrogenation catalyst deactivates over time, the amount of elemental sulfur, $SO_2$, process gases, and sulfur-containing contaminants can increase. In at least one embodiment, the amount of sulfur-containing contaminants in waste gas stream 56 is between 1 ppm and 50 ppm. In at least one embodiment, waste gas stream 56 can be vented to atmosphere where permitted by governmental regulations.

In at least one embodiment, waste gas stream 56 can be further processed. In at least one embodiment, waste gas stream 56, air stream 60, and fuel stream 64 are fed to oxidizer 165. Oxidizer 165 can be any oxidizer capable of combusting sulfur-containing compounds to produce $SO_2$. Examples of oxidizers suitable for use as oxidizer 165 include a free-flame thermal oxidizer and a catalytic oxidizer. In at least one embodiment, oxidizer 165 is a free-flame thermal oxidizer suitable to combust sulfur-containing contaminants, elemental sulfur and $H_2S$ to $SO_2$. Air stream 60 can be any $O_2$ containing gas suitable for use in oxidizer 165. Example gases suitable for use as air stream 60 include air, $O_2$ enriched air, pure $O_2$, or any combination thereof. In at least one embodiment, air stream 60 is air. In at least one embodiment, air stream 60 provides a stoichiometric excess of oxygen in oxidizer 165, where the stoichiometric excess of $O_2$ is operable to drive the conversion of sulfur-containing compounds to $SO_2$. In at least one embodiment, air stream 60 is from the same source as oxygen source 8. Fuel stream 64 can be any fuel gas suitable for firing in oxidizer 165. Fuel stream 64 provides additional fuel to adjust the temperature in oxidizer 165. In at least one embodiment, fuel stream 64 is selected from the group consisting of natural gas, and any $C_1$-$C_{6+}$ hydrocarbon, or combinations of the same. In at least one embodiment, fuel stream 64 is from the same source as fuel gas 12. Oxidizer 165 can combust the $H_2S$ and sulfur-containing contaminants in the presence of excess $O_2$ to create $SO_2$ along with other combustion products to create sulfur dioxide waste stream 68. Sulfur dioxide waste stream 68 includes $SO_2$, process gases, and trace amounts of sulfur and sulfur-containing contaminants. Sulfur dioxide waste stream 68 can be further processed or vented to atmosphere, where permitted by governmental regulations.

Figure 2:
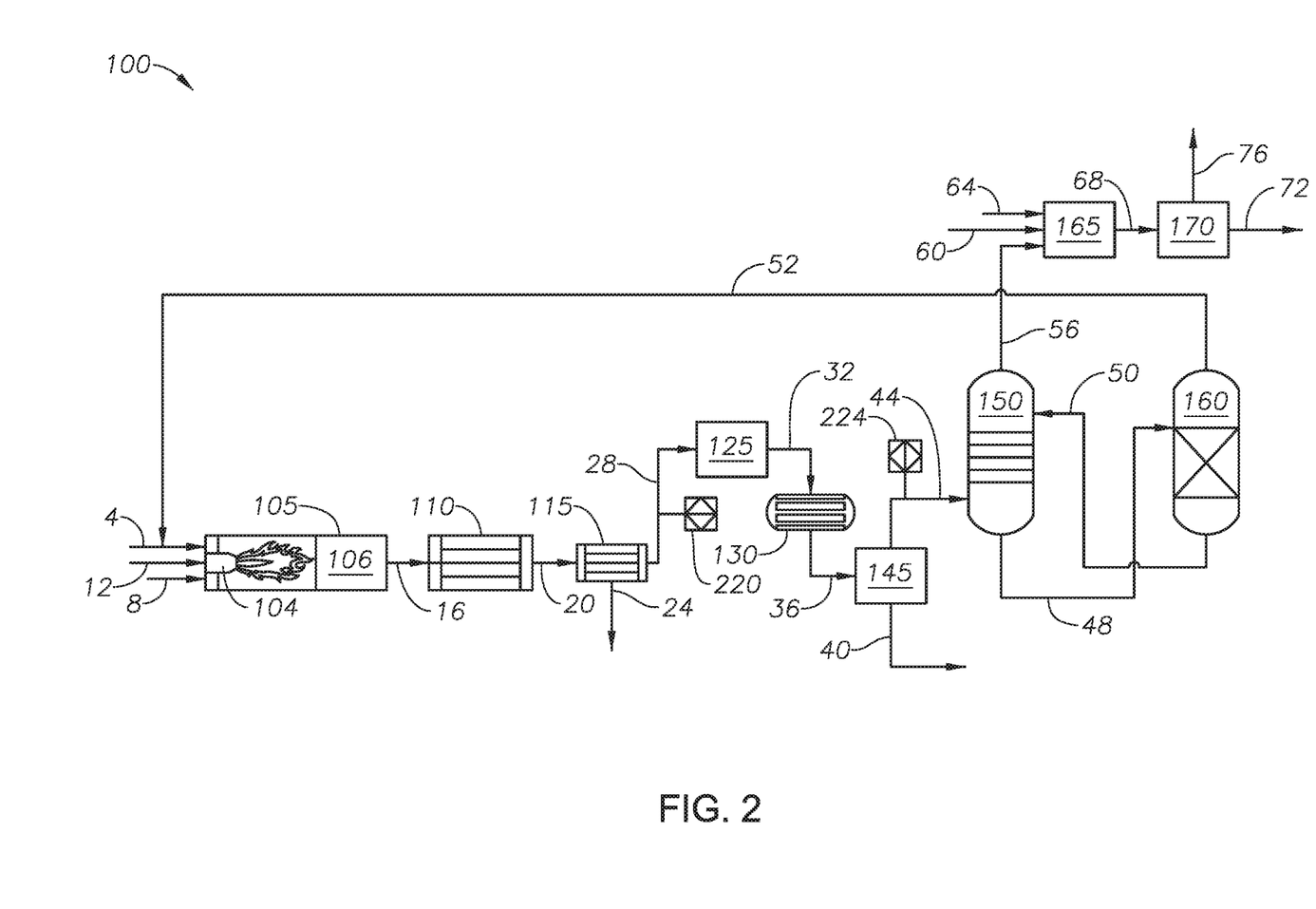
FIG. 2 is a process diagram of an embodiment of the elemental sulfur recovery unit.

In at least one embodiment, as shown in FIG. 1 and FIG. 2, sulfur dioxide waste stream 68 is fed to sulfur dioxide scrubbing unit 170 to create sulfur dioxide recycle stream 72 and waste effluent stream 76. Sulfur dioxide scrubbing unit 170 can be any type of scrubbing unit capable of removing an amount of $SO_2$ from a process stream. Waste effluent stream 76 can include process gases, $SO_2$, and trace levels of sulfur-containing contaminants and process contaminants. Waste effluent stream 76 contains $SO_2$ in an amount less than 1% by volume, alternately less than 0.1% by volume, alternately less than 0.01% by volume, alternately less than 0.001% by volume, alternately less than 0.0001% by volume, alternately less than 0.00005% by volume, alternately less than 0.00001% by volume. Waste effluent stream 76 can be sent for further processing, vented to atmosphere, or used in another processing unit. In at least one embodiment, waste effluent stream 76 is vented to atmosphere.

Sulfur dioxide recycle stream 72 contains the amount of $SO_2$ removed from sulfur dioxide waste stream 68 in sulfur dioxide scrubbing unit 170. In at least one embodiment, the amount of $SO_2$ in sulfur dioxide recycle stream 72 is between 80% and 99.99% by volume, alternately greater than 80% by volume, alternately greater than 99% by volume, alternately greater than 99.3% by volume, alternately greater than 99.5% by volume, alternately greater than 99.7% by volume, alternately greater than 99.9% by volume, alternately greater than 99.95% by volume, alternately greater than 99.99% by volume of the $SO_2$ generated in oxidizer 165. In at least one embodiment, sulfur dioxide recycle stream 72 contains saturated water in an amount between 3% by volume and 20% by volume. In at least one embodiment, sulfur dioxide recycle stream 72 is recycled to main burner 104 of thermal unit 106. In at least one embodiment, a hydrogen sulfide source and a sulfur dioxide source are fed to main burner 104 in addition to acid gas feed 4 to maintain a stoichiometric ratio of $H_2S$ to $SO_2$ of 15:1, alternately a stoichiometric ratio of $H_2S$ to $SO_2$ of greater than 10:1, alternately a stoichiometric ratio of $H_2S$ to $SO_2$ of 10:1, alternately a stoichiometric ratio of $H_2S$ to $SO_2$ of 5:1, and alternately a stoichiometric ratio of $H_2S$ to $SO_2$ of greater than 2:1 at the outlet of reaction furnace 105. In at least one embodiment, the hydrogen sulfide source is hydrogen sulfide recycle stream 52. In at least one embodiment, the hydrogen sulfide source is the combined stream of hydrogen sulfide recycle stream 52 and acid gas feed 4. In at least one embodiment, the sulfur dioxide source is sulfur dioxide recycle stream 72. The ratio of $H_2S$ to $SO_2$ in thermal unit 105 contributes to the overall conversion of $H_2S$ and sulfur-containing contaminants to elemental sulfur.

Hydrogen sulfide recycle stream 52 can be recycled to main burner 104. The flow rate of oxygen source 8 can be adjusted, such that together with acid gas feed 4 and hydrogen sulfide recycle stream 52 a target stoichiometric ratio of $H_2S$ to $SO_2$ at the outlet of thermal unit 105 can be achieved. In at least one embodiment, the target stoichiometric ratio of $H_2S$ to $SO_2$ is greater than about 15:1, alternately the target stoichiometric ratio of $H_2S$ to $SO_2$ is greater than about 10:1, alternately the target stoichiometric ratio of $H_2S$ to $SO_2$ is about 10:1, alternately the target stoichiometric ratio of $H_2S$ to $SO_2$ is about 5:1, and alternately the target stoichiometric ratio of $H_2S$ to $SO_2$ is greater than about 2:1 at the outlet of thermal unit 105.

The pressure drop in elemental sulfur recovery unit 100 can be less than 5 psi. In at least one embodiment, the pressure of acid gas feed 4 is between 7 psig and 15 psig. Thermal unit 105, waste heat boiler 110, sulfur condenser 115, gas reheater 125, and hydrogenation reactor 130 are at operating conditions that maintain the water in a vapor phase. In at least one embodiment, the pressure of acid gas feed 4 is due to the pressure of an upstream unit that operates at a pressure at or less than 20 psig.

Various process control elements can be included in the process to provide for better control of the process units and the overall conversion of $H_2S$ and sulfur-containing contaminants to elemental sulfur. Referring to FIG. 2, tail gas analyzer 220 can be installed after sulfur condenser 115 to analyze the composition in non-condensed gases stream 28. Tail gas analyzer 220 can be any instrument capable of measuring the components of a stream as part of a feedback control loop of the thermal unit. In at least one embodiment, tail gas analyzer 220 can analyze the concentration of hydrogen sulfide and sulfur dioxide in non-condensed gases stream 28. In at least one embodiment, the results from tail gas analyzer 220 can be used to adjust the flow rate of oxygen source 8. A temperature sensor (not shown) can be included in thermal unit 105. The temperature sensor can be used as part of a temperature controlled feedback loop to ensure the minimum reaction furnace temperature is being maintained. In at least one embodiment, the temperature sensor can be used to adjust the flow rate of fuel gas 12 as needed to maintain or reach the minimum reaction furnace temperature. Hydrogen analyzer 224 can be installed after process desuperheater 145 to measure the amount of $H_2$ in cooled effluent 44. Hydrogen analyzer 224 can be any instrument capable of measuring the components of a stream as part of a feedback control loop. In at least one embodiment, the results from hydrogen analyzer 224 can be used to control gas reheater 125 or to control the addition of surplus hydrogen to the process to meet the operating condition of hydrogenation reactor 130 having a minimum excess of two percent hydrogen at the outlet of hydrogenation reactor 130 to ensure completion of the reduction reactions in hydrogenation reactor 130.

The overall conversion of $H_2S$ and sulfur-containing contaminants in acid gas feed 4 to elemental sulfur is greater than 99 mol %, alternately greater than 99.2 mol %, alternately greater than 99.4 mol %, alternately greater than 99.6 mol % alternately greater than 99.8 mol %, alternately greater than 99.9 mol %.

In at least one embodiment, elemental sulfur recovery unit 100 recovers greater than 99.9% of the sulfur introduced to the system.

In at least one embodiment, elemental sulfur recovery unit 100 is in the absence of any conventional Claus plant catalytic stages, that use catalyst to convert hydrogen sulfide and sulfur dioxide to elemental sulfur. A conventional Claus plant can include between two and four (4) catalytic stages. Elemental sulfur recovery unit 100 contains no Claus plant catalytic stages. Advantageously, elemental sulfur recovery unit 100, in the absence of a conventional Claus plant catalytic stage, can handle acid gas feed streams with a concentration of $H_2S$ at or greater than 50 percent, alternately at or greater than 40 percent, alternately at or greater than 30 percent, alternately at or greater than 20 percent, alternately at or greater than 10 percent, and alternately at or greater than 5 percent.

One of skill in the art understands that certain components introduced in thermal unit 105 are non-combustible gases and can be present in every stream of elemental sulfur recovery unit 100; venting waste gas stream 56 or waste effluent stream 76 prevents these non-combustible gases from building up in elemental sulfur recovery unit 100. In addition, one of skill in the art understands that where a unit is said to react certain reactants to produce a product stream, the product stream can contain amounts of the reactants unless specifically stated otherwise.

Advantageously, the elemental sulfur recovery unit addresses the presence of carbonyl sulfide and carbon disulfide in the effluent from the thermal unit without the need for a conventional Claus plant catalytic stage. The hydrogenation reactor of the elemental sulfur recovery unit can be designed to handle carbonyl sulfide and carbon disulfide. In at least one embodiment, the hydrogenation reactor can include a supplemental titanium layer underneath the hydrogenation catalyst. In at least one embodiment, the absorber unit can be designed to handle the higher load of $H_2S$ to the absorber that occurs as a result of the absence of a conventional Claus plant catalytic stage.

Although the embodiments have been described in detail, it should be understood that various changes, substitutions, and alterations can be made hereupon without departing from the principle and scope. Accordingly, the scope should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed as from one particular value to another particular value. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the embodiments pertain, except when these references contradict the statements made here.

As used throughout and in the appended claims, the words "comprise," "has," "contains" and "include" and all grammatical variations thereof are each intended to have an open, non-limiting meaning that does not exclude additional elements or steps.

As used here, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope.

What is claimed is:

1. A sulfur recovery process to recover elemental sulfur from an acid gas feed, the sulfur recovery process comprising the steps of:
feeding the acid gas feed, an oxygen source, and a fuel gas to a main burner of a thermal unit, the main burner configured to combust the acid gas feed, the oxygen source, and the fuel gas to a minimum reaction furnace temperature, the acid gas feed comprising hydrogen sulfide, wherein the oxygen source comprises oxygen in stoichiometric excess;
reacting the acid gas feed, the oxygen source, and the fuel gas at the minimum reaction furnace temperature in a reaction furnace of the thermal unit to create a reaction furnace outlet stream, wherein the reaction furnace outlet stream comprises elemental sulfur and sulfur-containing contaminants, wherein an amount of the hydrogen sulfide is converted to elemental sulfur in the reaction furnace as part of the Claus reaction, wherein conversion of the hydrogen sulfide to elemental sulfur is in the range between 40 mol % and 78 mol %;
recovering heat from the reaction furnace outlet stream in a waste heat boiler to create a waste heat boiler effluent, the waste heat boiler configured to capture heat from the reaction furnace outlet stream to heat a boiler feedwater stream to create saturated steam;
condensing the waste heat boiler effluent in a sulfur condenser to produce a condensed liquid sulfur stream and a non-condensed gases stream, the condensed liquid sulfur stream comprising the elemental sulfur, the non-condensed gases stream comprising water vapor and the sulfur-containing contaminants;

reheating the non-condensed gases stream in a gas reheater to a hydrogenation temperature to generate a hot gases stream;

feeding the hot gases stream to a hydrogenation reactor, the hydrogenation reactor comprising a hydrogenation catalyst;

reacting the hot gases stream in the hydrogenation reactor to produce a hydrogenation effluent, wherein the hydrogenation effluent comprises hydrogen sulfide and water vapor;

cooling the hydrogenation effluent in a process desuperheater to produce a condensed water and a cooled effluent, wherein the cooled effluent comprises hydrogen sulfide, wherein 51 percent or more of the water vapor present in the hydrogenation effluent is condensed in the process desuperheater such that the condensed water comprises liquid water;

feeding the cooled effluent to an absorber, wherein the absorber comprises an absorbing solvent, wherein the absorbing solvent is configured to absorb hydrogen sulfide from the cooled effluent to generate an absorbed hydrogen sulfide rich solvent stream and a waste gas stream; and feeding the absorbed hydrogen sulfide rich solvent stream into a regenerator, the regenerator configured to desorb the hydrogen sulfide from the absorbed hydrogen sulfide rich solvent stream to generate a hydrogen sulfide recycle stream and a regenerated solvent.

2. The sulfur recovery process of claim 1, wherein the minimum reaction furnace temperature is between 1050° C. and 1250° C.

3. The sulfur recovery process of claim 1, wherein the hot gases stream is between 125° C. and 300° C.

4. The sulfur recovery process of claim 1, further comprising the step of venting the waste gas stream to atmosphere.

5. The sulfur recovery process of claim 1, wherein the amount of hydrogen sulfide in the hydrogen sulfide recycle stream is greater than 25% by volume.

6. The sulfur recovery process of claim 1 further comprising the step of:
combusting the waste gas stream, an air stream, and fuel stream in an oxidizer to produce a sulfur dioxide waste stream, the sulfur dioxide waste stream comprising sulfur dioxide.

7. The sulfur recovery process of claim 6, further comprising the steps of:
removing an amount of sulfur dioxide from sulfur dioxide waste stream to produce a sulfur dioxide recycle stream and a waste effluent stream such that the waste effluent stream comprises less than 1% by volume sulfur dioxide; and
recycling the sulfur dioxide recycle stream to the main burner of the thermal unit.

* * * * *